(12) United States Patent
Saito et al.

(10) Patent No.: US 12,596,049 B2
(45) Date of Patent: Apr. 7, 2026

(54) SEALING COMPONENT INSPECTION METHOD, INSPECTION DEVICE, AND INSPECTION PROGRAM

(71) Applicant: NOK CORPORATION, Tokyo (JP)

(72) Inventors: Tatsuya Saito, Shizuoka (JP); Tomohiro Kawai, Kanagawa (JP)

(73) Assignee: NOK CORPORATION (JP)

( * ) Notice: Subject to any disclaimer, the term of this patent is extended or adjusted under 35 U.S.C. 154(b) by 373 days.

(21) Appl. No.: 18/039,415

(22) PCT Filed: Dec. 15, 2021

(86) PCT No.: PCT/JP2021/046355
§ 371 (c)(1),
(2) Date: May 30, 2023

(87) PCT Pub. No.: WO2022/185660
PCT Pub. Date: Sep. 9, 2022

(65) Prior Publication Data
US 2023/0417620 A1 Dec. 28, 2023

(30) Foreign Application Priority Data
Mar. 3, 2021 (JP) ................................. 2021-033460

(51) Int. Cl.
*G01M 3/20* (2006.01)

(52) U.S. Cl.
CPC ..................................... *G01M 3/20* (2013.01)

(58) Field of Classification Search
CPC ................................. G01M 3/20; Y02E 60/50
See application file for complete search history.

(56) References Cited

U.S. PATENT DOCUMENTS 6,393,897 B1 * 5/2002 Arnold .................. G01M 3/227
73/40.7
7,218,473 B2 * 5/2007 Bernett .............. G11B 33/1466
29/603.03
(Continued)

FOREIGN PATENT DOCUMENTS

JP       2000-186632 A       7/2000
JP       2004-157035 A       6/2004
(Continued)

OTHER PUBLICATIONS

Yao et al., "Experimental Study of Helium Leakage Parameters in Flexible Composite", Journal of Applied Polymer Science, vol. 116, No. 6, Feb. 22, 2010, pp. 3562-3568 (7 Pages).
(Continued)

*Primary Examiner* — Tung S Lau
(74) *Attorney, Agent, or Firm* — Harness, Dickey & Pierce, P.L.C.

(57) ABSTRACT

The gas permeation amount of each of a plurality of rubber sealing components manufactured according to the same specifications is measured by helium leak testing, and for each sealing component, sample data is acquired which is formed of a pair of a measurement value at a criterion time CT in an unstable period A, during which the permeation amount increases, and a measurement value in a stable period B, during which the permeation amount is stable (sample acquisition). The relationship between the measurement value at the criterion time CT and the measurement value in the stable period is defined by a linear function on the basis of the plurality of acquired sample data (function definition). The gas permeation amount of a sealing component to be inspected which has been manufactured according to the same specifications as those for the plurality of rubber sealing components is measured by helium leak testing, and a measurement value in the stable period B is
(Continued)

MEASUREMENT TIME (t)

estimated, using the defined linear function, on the basis of the measurement value in the unstable period A of the sealing component to be inspected (leakage amount estimation).

11 Claims, 3 Drawing Sheets

(56)                    References Cited

U.S. PATENT DOCUMENTS

| | | | | |
|---|---|---|---|---|
| 8,656,758 | B2 * | 2/2014 | Brown | G01M 3/229 |
| | | | | 73/40.7 |
| 9,671,308 | B2 * | 6/2017 | Wang | G01M 3/229 |
| 2003/0074954 | A1 | 4/2003 | Engle et al. | |
| 2003/0179489 | A1 * | 9/2003 | Bernett | G11B 33/1466 |
| | | | | 360/97.22 |
| 2007/0268621 | A1 * | 11/2007 | Bernett | G11B 33/1466 |
| | | | | 360/99.21 |
| 2012/0137751 | A1 * | 6/2012 | Brown | G01M 3/229 |
| | | | | 250/288 |
| 2015/0276443 | A1 | 10/2015 | Leroy et al. | |

FOREIGN PATENT DOCUMENTS

| | | | | |
|---|---|---|---|---|
| JP | 2016-500826 A | 1/2016 | | |
| JP | 2016-106215 A | 6/2016 | | |
| JP | 2020-159935 A | 10/2020 | | |
| WO | WO 2015/056661 A1 * | 4/2015 | | G01M 3/20 |

OTHER PUBLICATIONS

Extended European Search Report for corresponding European Patent Application No. 21929218.2 dated Dec. 18, 2024 (5 Pages).
International Search Report and Written Opinion of the ISA issued in PCT/JP2021/046355, mailed Mar. 8, 2022; ISA/JP. (6 pages).
Takahashi & Ogasawara, "Gas Permeability Test," A Journal of the Society of Rubber Science and Technology, Janan, vol. 49, No. 8, 39-47 (1976). (11 pages).

* cited by examiner

SEALING COMPONENT INSPECTION METHOD, INSPECTION DEVICE, AND INSPECTION PROGRAM

CROSS REFERENCE TO RELATED APPLICATIONS

This application is a U.S. National Phase Application under 35 U.S.C. 371 of International Application No. PCT/JP2021/046355, filed on Dec. 15, 2021, which claims priority to Japanese Patent Application No. 2021-033460, filed on Mar. 3, 2021. The entire disclosures of the above applications are expressly incorporated by reference herein.

BACKGROUND

Technical Field

The disclosure relates to a sealing component inspection method, inspection device, and inspection program to be used for inspecting sealing components for permeation leakage.

Related Art

In a solid polymer fuel battery, for example, a sealing member assumes an important role in partitioning the flow path for oxygen and the flow path for hydrogen. This type of fuel battery has a stack structure in which a plurality of fuel battery cells are stacked, each cell having a membrane electrode assembly (MEA) sandwiched between a pair of separators. The membrane electrode assembly is a structure having an electrolyte membrane sandwiched between an anode electrode (positive electrode) and a cathode electrode (negative electrode), and each electrode has a laminate structure of a catalyst layer and a gas diffusion layer (GDL). The separator is in close contact with the gas diffusion layer and forms a flow path for hydrogen and oxygen between the separator and the gas diffusion layer.

The fuel battery cells utilize the flow paths formed in the separators to supply hydrogen to the anode electrode and oxygen to the cathode electrode. This causes an electrochemical reaction opposite to the electrolysis of water thereby to generate electricity.

Because of the structure of the solid polymer fuel battery described above, the hydrogen flow path and the oxygen flow path must be securely partitioned, so that high sealing performance is required for sealing components that partition these flow paths. The hydrogen sealability, in particular, is highly important from the viewpoint of safety and power generation efficiency.

Meanwhile, rubber, which is a material of sealing components, has gas permeability. For this reason, in a solid polymer fuel battery, not only does a gas leak from gaps formed between sealing components and other members, but permeation leakage of hydrogen through the sealing components also occurs (refer to paragraph of Japanese Unexamined Patent Application Publication No. 2020-159935).

Problem to be Solved

The permeation leakage of a sealing component can be inspected by helium leak testing using a helium leak detector. The helium leak testing is highly sensitive among leakage inspections and has excellent inspection accuracy for minute leaks. Although the detection of permeation leakage is not specified, the detection of gas leaks in sealing components by using a helium leak detector is introduced also in Japanese Unexamined Patent Application Publication No. 2016-106215, which discloses a solid polymer fuel battery (refer to paragraph [0003] in the document).

While the helium leak testing using a helium leak detector can advantageously detect minute leaks, it takes time to reach a state in which an accurate leakage amount can be measured. For example, a sealing component used in a solid polymer fuel battery requires an inspection time of as many as 7 to 10 minutes. If an inspection were to be conducted three times on one inspection object, then it would inconveniently take as many as 21 to 30 minutes to complete.

The helium leak testing takes time because of the principle that a leakage amount is measured by detecting helium contained in an inspection gas that has permeated an inspection object, so that waiting time is required until the permeation amount of the inspection gas is stabilized. Although JIS-Z2331 specifies various methods for helium leak testing, no matter which method is used, the inspection principle of detecting helium contained in an inspection gas that has permeated an inspection object remains the same, thus requiring a long inspection time.

A reduction in the inspection time is desired.

SUMMARY

An embodiment of a sealing component inspection method includes steps of: measuring, by helium leak testing, a gas permeation amount of each of a plurality of rubber sealing components manufactured according to the same specifications; acquiring, for each of the sealing components, sample data formed of a pair of a measurement value at a predetermined criterion time in an unstable period, during which a permeation amount increases, and a measurement value in a stable period, during which a permeation amount is stable; defining a relationship between the measurement value at the criterion time and the measurement value in the stable period by a linear function on the basis of a plurality of acquired sample data; measuring, by helium leak testing, the gas permeation amount of a sealing component to be inspected that has been manufactured according to the same specifications as those for the plurality of rubber sealing components; and estimating, by using the linear function, a measurement value of the sealing component, which will be inspected, in the stable period on the basis of the measurement value thereof at the criterion time.

An embodiment of a sealing component inspection device includes: an input unit to which a measurement value of the gas permeation amount of a rubber sealing component measured by helium leak testing is input; a sample generation unit that generates, for each measurement value of a plurality of sealing components manufactured according to the same specifications, sample data formed of a pair of a measurement value at a predetermined criterion time in an unstable period during which a permeation amount increases, and a measurement value in a stable period during which a permeation amount is stable; a definition unit that defines a relationship between the measurement value at the criterion time and the measurement value in the stable period by a linear function on the basis of a plurality of generated sample data; and an estimation unit that estimates, using the linear function, a measurement value of a sealing component to be inspected, which has been manufactured according to the same specifications as those for the plurality of rubber sealing components, in the stable period on the basis of the measurement value thereof at the criterion time.

An embodiment of a sealing component inspection program installed in a computer to cause the computer to implement: a function to accept input of a measurement value of a gas permeation amount of each of a plurality of rubber sealing components, which have been manufactured according to the same specifications, measured by helium leak testing; a function of generating, for each of the sealing components, sample data formed of a pair of a measurement value at a predetermined criterion time in an unstable period during which a permeation amount increases and a measurement value in a stable period during which a permeation amount is stable; a function of defining, by a linear function, a relationship between the measurement value at the criterion time and the measurement value in the stable period on the basis of a plurality of generated sample data; a function of accepting input of a measurement value of a gas permeation amount of a sealing component to be inspected, which has been manufactured according to the same specifications as those for the plurality of rubber sealing components, the gas permeation amount being measured by helium leak testing; and a function of estimating a measurement value of the sealing component, which will be inspected, in the stable period by using the linear function on the basis of the measurement value thereof at the criterion time.

Effect

The time required for a permeation inspection of inspecting a sealing component for permeation leakage can be shortened.

DETAILED DESCRIPTION

Embodiments will be described with reference to the accompanying drawings. The present embodiments include an inspection method and an inspection device for sealing components, with which sealing components (not illustrated) are inspected for permeation leakage by helium leak testing using a helium leak detector 201 (refer to FIG. 3; hereinafter referred to also as the "leak detector 201"). In the present embodiments, a computer program used for the inspection method and the inspection device will also be introduced.

The following items will be explained in this order.
1. Regularity of gas permeability curve
2. Inspection principle
3. Inspection device
4. Inspection method
   (1) Sample acquisition step
   (2) Function definition step
   (3) Leakage amount estimation step Summary
1. Regularity of Gas Permeability Curve To inspect the gas permeability of a rubber sealing component, such as a seal used for a solid polymer fuel battery to partition a hydrogen flow path and an oxygen flow path, helium leak testing (hereinafter referred to also as "the leak testing") is carried out by using the leak detector 201.

Figure 1:
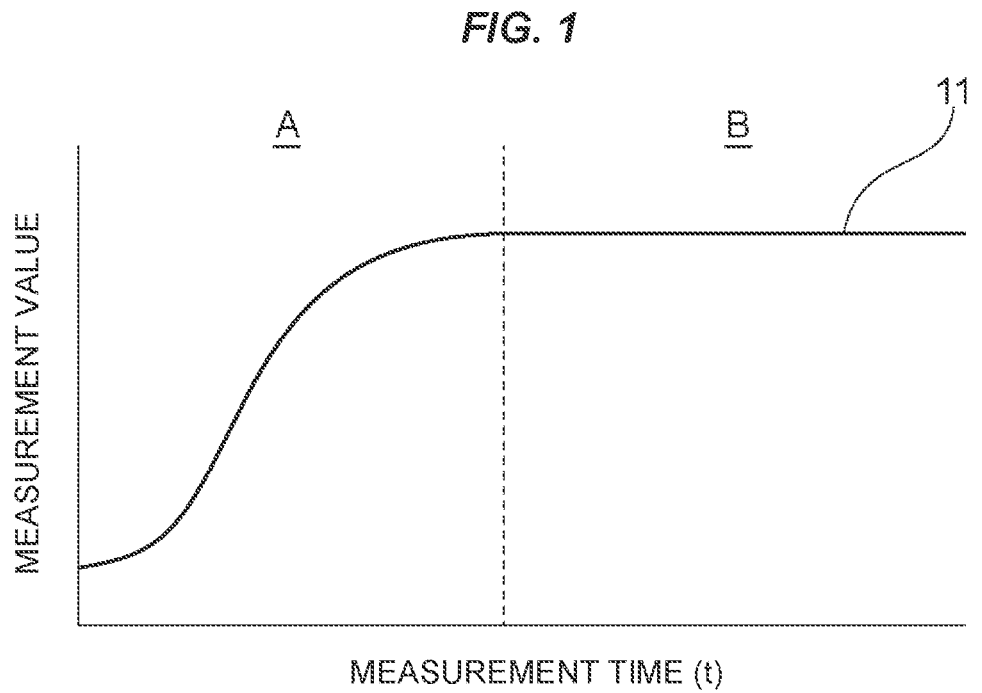
FIG. 1 is a graph illustrating a gas permeability curve of a sealing component.

As illustrated in FIG. 1, when the measurement values of a sealing component obtained from the outputs of the leak detector 201 are indicated in terms of a time axis function, the measurement values pass through an unstable period A, during which the permeation amount increases, and then transition to a stable period B, during which the permeation amount is stable. This is because, as described above, due to the principle of the leak detector 201, which determines the leakage amount by detecting helium contained in an inspection gas that has permeated through the sealing components, thus requiring time for the permeation amount of the inspection gas permeating through the sealing component to stabilize.

Therefore, when the horizontal axis indicates time, and the vertical axis indicates measurement values, a gas permeability curve 11 is shaped as illustrated in FIG. 1. As is clear from, for example, the theoretical equation of the gas permeation amount described on pages 39 to 40 of "Gas Permeability Test" by Akira Takahashi and Goro Ogasawara, Journal of The Society of Rubber Science and Technology, Japan, Vol. 49, No. 8, 1976, p 39-47, the gas permeability curve 11 can be represented by the following theoretical equation that defines the permeation amount at a certain time.

[Math. 1]

$$Q(t) = -DA\left(\frac{\partial c}{\partial x}\right)_{x=w} = \frac{P\Delta pA}{w}\left[1 + 2\sum_{n=1}^{\infty}(-1)^n \exp\left(-D\left(\frac{n\pi}{w}\right)^2 t\right)\right] \quad (1)$$

Q: permeation amount
t: time
D: diffusion coefficient
A: permeation sectional area
w: sealing contact width (permeation length)
$\partial c/\partial x$: gas concentration (c) per sealing contact width (x=w)
P: permeability constant
$\Delta p$: helium pressure Diffusion coefficient D and permeability constant P denote values specific mainly to the materials of the sealing components, and are factors that determine the gas permeability curve 11.

In actual leak testing, the gas concentration c and the helium pressure $\Delta p$ gradually increase immediately after a start, and eventually stabilize. This results in the unstable period A, during which the permeation amount increases, and the stable period B, during which the permeation amount is stable.

2. Inspection Principle

The gas permeability curve 11 is represented by the theoretical equation of expression (1), so that any sealing component will exhibit similar shapes.

Figure 2:
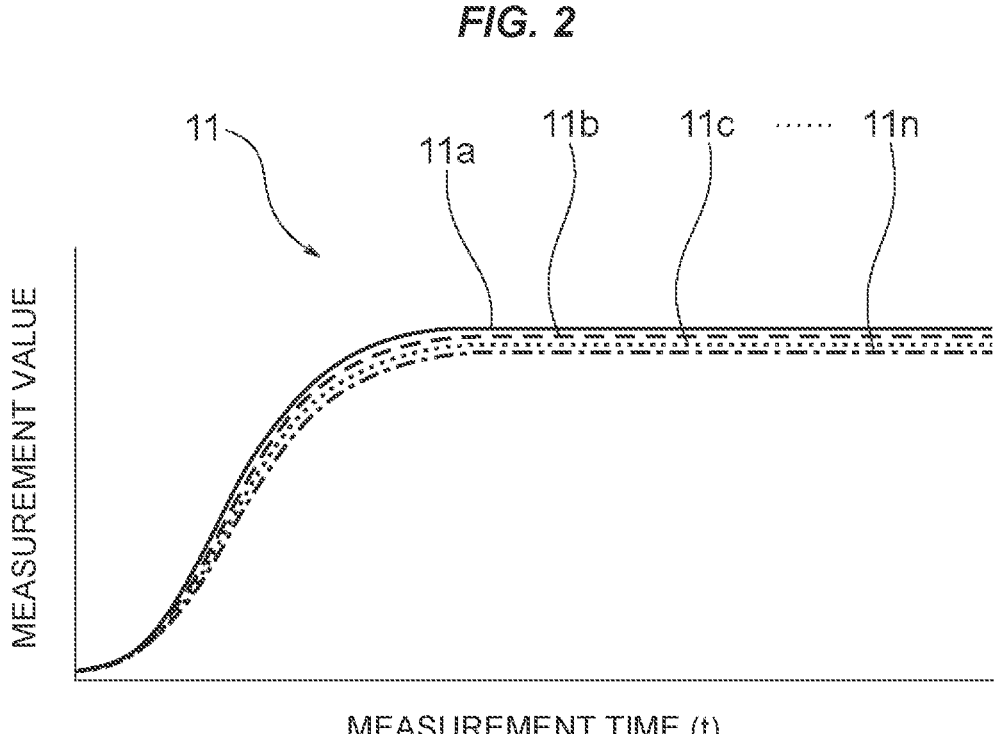
FIG. 2 is a graph illustrating the gas permeability curve of each of a plurality of different sealing components.

Gas permeability curves 11a, 11b, 11c, . . . , 11n illustrated in the graph of FIG. 2 are the gas permeability curves 11 based on the amounts of gas permeation measured by the leak detector 201 on a plurality of different sealing components manufactured according to the same specifications. It is seen that the similarity of the curve shapes is maintained while the values are scattered due to the individual differences of the individual sealing components. The inspection method of the present embodiment is focused on this aspect, and estimates the measurement values in the stable period B on the basis of the measurement values in the unstable period A among the measurement values of the sealing components to be inspected, the measurement values being obtained by the leak detector 201 (refer to FIG. 5 and FIG. 6).

To estimate the measurement values in the stable period B, the inspection method of the present embodiment carries out three steps, namely, a sample acquisition step, a function definition step, and a leakage amount estimation step. The inspection device of the present embodiment includes an input unit and a sample generation unit that support the implementation of the sample acquisition step, a definition unit that supports the implementation of the function definition step, and an estimation unit that supports the implementation of the leakage amount estimation step.

In the sample acquisition step, a gas permeation amount Q (t) of each of a plurality of rubber sealing components manufactured according to the same specifications is measured by the helium leak testing, and then, for each sealing component, a plurality of sample data SD (refer to FIG. 4) are acquired by pairing the measurement values at a criterion time CT (refer to FIG. 5) in the unstable period A, during which the permeation amount increases, and the measurement values in the stable period B, during which the permeation amount is stable.

In the function definition step, the relationship between the measurement values at the criterion time CT in the unstable period A and the measurement values in the stable period B is defined using the linear function on the basis of the plurality of sample data SD.

In the leakage amount estimation step, the gas permeation amount Q (t) of a sealing component to be inspected, which has been manufactured according to the same specifications as those for the plurality of rubber sealing components, is measured by the helium leak testing, and then, the measurement value in the stable period B is estimated, using the defined linear function, on the basis of the measurement value in the unstable period A of the sealing component to be inspected.

3. Inspection Device

In the present embodiment, the inspection method consisting of the above-described three steps is implemented by an information processing device such as a personal computer (PC), a tablet terminal, or the like, and the leak detector 201. In this case, the architecture will be introduced by taking, as an example, the case where a PC 101 is used as the information processing device.

Figure 3:
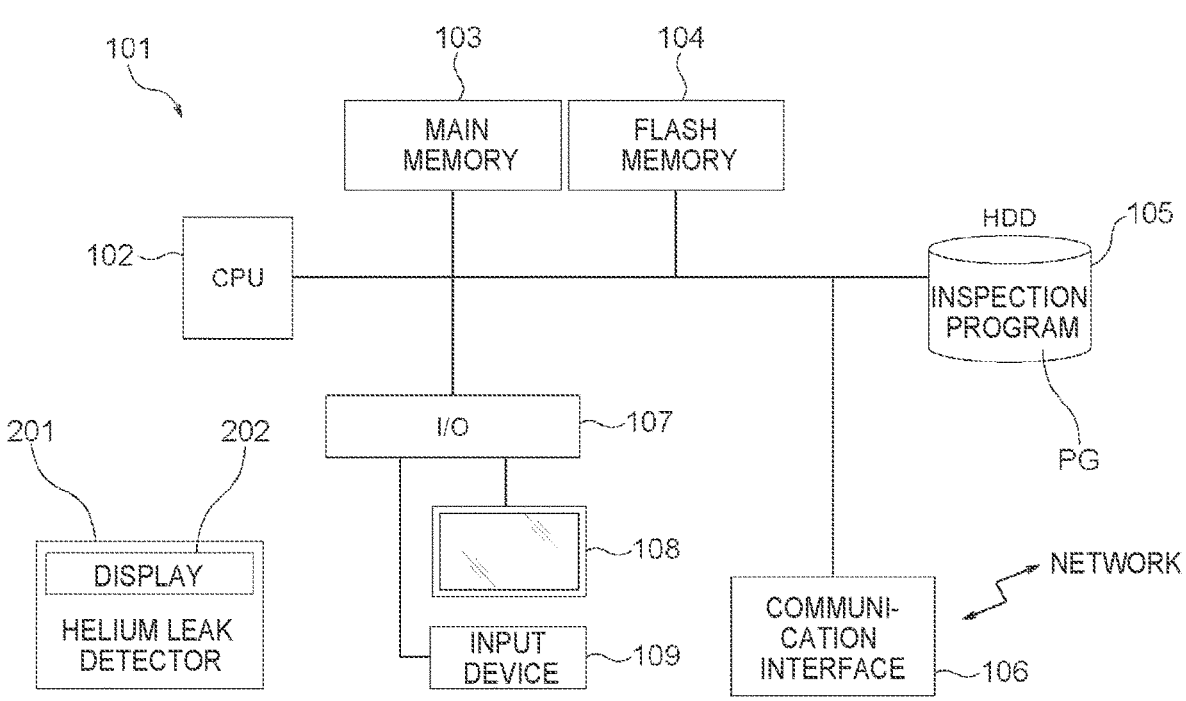
FIG. 3 is a block diagram illustrating, as an embodiment, the hardware configurations of a helium leak detector and a computer required for carrying out a method for inspecting sealing components.

As illustrated in FIG. 3, the architecture of the PC 101 is no different from that of a typical personal computer. A CPU 102, which performs various types of processing and centrally controls each unit, is placed at the core, and a main memory 103, a flash memory 104, an HDD 105, a communication interface (IF) 106 for connecting to a network, and an I/O 107 for connecting peripheral devices are connected to the CPU 102.

An example of an input device 109 is a keyboard and a mouse prepared for data input, and another example is a touch panel provided in a display device 108. A touch panel is used for the input device 109 if an information terminal such as a tablet terminal or a smartphone is used as the information processing device. The display device 108 and the input device 109 serve as the user interface of the PC 101.

A computer program and an inspection program PG used for inspecting sealing components are installed in the HDD 105 of the PC 101. The inspection program PG is, for example, typical spreadsheet software that can perform linear function calculations on the basis of the values entered in individual cells. Such inspection program PG is read in whole or in part into the main memory 103 at the time of a startup thereof to cause the CPU 102 to perform various types of processing for supporting the implementation of the sealing component inspection method, i.e., the processing of the first to the third steps, which will be described later.

The inspection program PG is stored not only in the HDD 105 but also in various storage media such as an optical medium, a semiconductor storage device, and a data transmission medium so as to have portability and to enable data transfer.

The leak detector 201 has a display 202 to show the measurement results of helium leak testing on the display 202.

4. Inspection Method

The sealing component inspection method supported by various types of processing performed by the PC 101 according to the inspection program PG will be described in order.

(1) Sample Acquisition Step

This step is a step of acquiring, as the sample data SD, the values of the explanatory variable and the objective variable of the linear function defined by a next step (the function definition step). The sample data SD is acquired by measuring the gas permeation amount Q (t) of each of a plurality of different sealing components by the leak detector 201.

The leak detector 201 displays the measurement values collected by leak testing from the plurality of sealing components, i.e., the data of the gas permeation amount Q (t) at certain time intervals, on the display 202. The data of the permeation amount Q (t) is a series of data acquired at a predetermined cycle during the period of time from the unstable period A, in which the value of the permeation amount Q (t) increases, to the stable period B, in which the value thereof is stable.

Before performing the measurement by the leak detector 201, the inspection program PG is activated in the PC 101. The inspection program PG is the spreadsheet software that can perform function calculations as described above, and when activated, causes the display device 108 to display a plurality of cells (not illustrated) in a matrix.

An operator obtains, among the permeation amounts Q (t) displayed on the display 202 of the leak detector 201, data by pairing the measurement value at the criterion time CT in the unstable period A, during which the value increases, and the measurement value in the stable period B, during which the value is stable, as the sample data SD, and enters these values into the cells of the spreadsheet software.

At this time, the input device 109 of the PC 101 functions as an input unit to which the measurement values of the amounts of gas permeation Q (t) of the sealing components obtained by the leak testing are input.

The criterion time CT means a point at which a predetermined time has elapsed after the leak testing was performed by the leak detector 201. The implication of the criterion time CT is the same in the sample acquisition step, and the same meaning applies also to the criterion time CT (refer to FIG. 5) in the leakage amount estimation step, which will be described later. However, the criterion time CT does not have to match exactly in seconds, and deviations within a certain range of time are allowed. For example, a deviation of several seconds to several tens of seconds poses no problem.

The quantity of data of the sample data SD to be input is 30 or more. More specifically, an operator inputs the values of the permeation amount Q (t) constituting the sample data SD to the PC 101 for each of 30 or more rubber sealing components manufactured according to the same specifications.

According to the inspection program PG, the CPU 102 of the PC 101 temporarily stores the input sample data SD in, for example, a work area (not illustrated) of the main memory 103 to prepare for carrying out the function definition step, which is the next step.

Thus, for each measurement value of the plurality of sealing components manufactured according to the same specifications, the PC 101 implements the function of the sample generation unit that generates the sample data SD consisting of the pair of the measurement value at the predetermined criterion time CT in the unstable period A, during which the permeation amount Q (t) increases, and the measurement value in the stable period B, during which the permeation amount is stable.

(2) Function Definition Step

Based on the plurality of sample data SD temporarily stored in the work area of the flash memory 104, the inspection program PG defines the relationship between the measurement value at the criterion time CT in the unstable period A and the measurement value in the stable period B by the linear function. At this time, even if the inspection program PG is constructed to automatically perform all or a part of a series of processing by using a program such as a macro, the inspection program PG may be constructed to perform all or a part of such a series of processing by commands based on manual inputs by the operator.

As an example, the inspection program PG uses the measurement values at the criterion time CT in the unstable period A included in the sample data SD as explanatory variables and the measurement values in the stable period B as objective variables in order to obtain a regression line RL (refer to FIG. 4) from the plurality of sample data SD, and causes the CPU 102 to perform an arithmetic operation for determining a linear function equation from the regression line RL.

Figure 4:
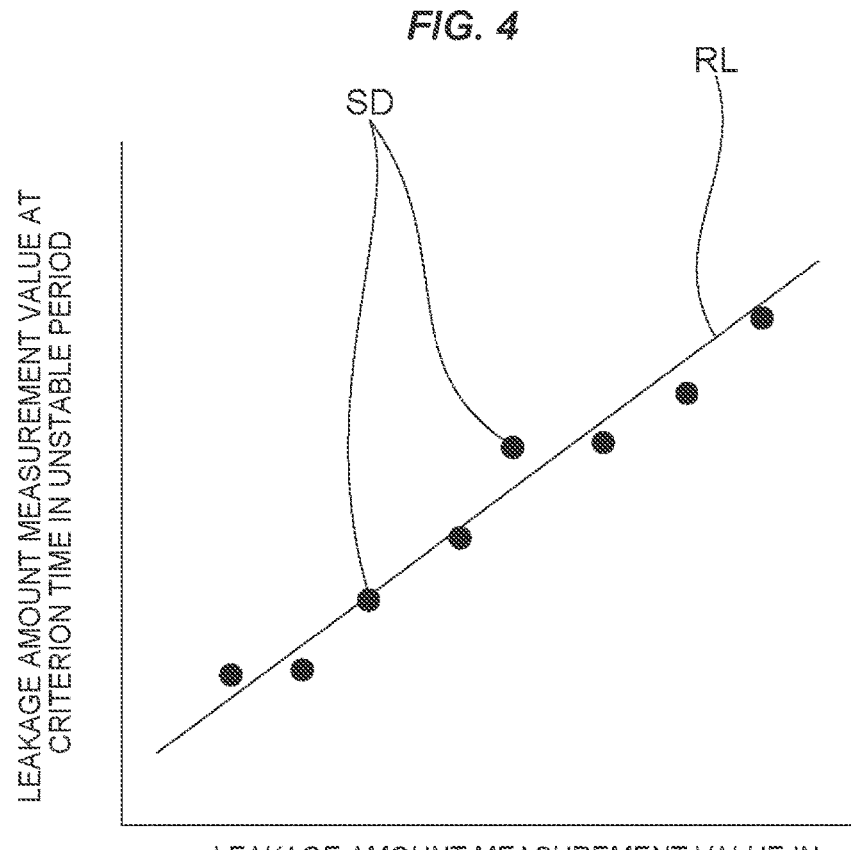
FIG. 4 is a graph illustrating a plurality of sample data, the measurement values at a criterion time in an unstable period being indicated on the Y-axis and the measurement values in a stable period being indicated on the X-axis, and a regression line based on the sample data.

FIG. 4 is a graph illustrating the plurality of sample data SD, the measurement values of the permeation amount Q (t) at the criterion time CT in the unstable period A being indicated on the Y-axis and the measurement values of the permeation amount Q (t) in the stable period B of the same sealing component corresponding to the measurement values being indicated on the X-axis, and the regression line RL based on these sample data SD. This graph is conceptual and illustrates a reduced number of sample data SD for ease of viewing.

In the graph of FIG. 4, the regression line RL is represented by the following linear function equation:

$$Y=aX+b \tag{2}$$

In the present embodiment, the measurement values at the criterion time CT in the unstable period A (Y values) are used as explanatory variables and the measurement values in the stable period B (X values) are used as objective variables; therefore, expression (2) is used by being transformed into expression (3) given below.

$$X=(Y-b)/a \tag{3}$$

To determine constant a (inclination) and constant b (y segment) in expressions (2) and (3), the inspection program PG causes the CPU 102 to perform, for example, the least square method, that is, arithmetic processing for minimizing the sum of the squares of errors of the individual sample data SD. The CPU 102 calculates the inclination of constant a according to the following expression (4), in which the covariance of X and Y is divided by the variance of X.

$$\frac{\frac{1}{n}\sum_{i=1}^{n}(x_i - \bar{x})(y_i - \bar{y})}{\frac{1}{n}\sum_{i=1}^{n}(x_i - \bar{x})^2} \tag{4}$$

n: total number of sample data (X, Y)
$x_i$: numerical value of each sample data X
x bar: mean value of sample data X
$y_i$: numerical value of each sample data Y
y bar: mean value of sample data Y The segment of constant b is calculated by substituting the mean value of the measurement values (Y values) at the criterion time CT into Y, the mean value of the measurement values in the stable period B into X, and constant a determined in expression (4) into a in expression (2) given above.

In the present embodiment, data having large variations are eliminated by a correlation coefficient and a coefficient of determination, taking variations in the sample data SD into account. As an example of a method for this purpose, when defining the linear function of expression (2), sample data SD for which a correlation coefficient R is 0.9 or more is used.

The correlation coefficient R can be determined by dividing the covariance of X and Y by the product of a standard error of X and a standard error of Y. The inspection program PG causes the CPU 102 to perform the calculation of expression (5) given below so as to calculate the correlation coefficient R.

$$R = \frac{\frac{1}{n}\sum_{i=1}^{n}(x_i - \bar{x})(y_i - \bar{y})}{\sqrt{\frac{1}{n}\sum_{i=1}^{n}(x_i - \bar{x})^2}\sqrt{\frac{1}{n}\sum_{i=1}^{n}(y_i - \bar{y})^2}} \tag{5}$$

The inspection program PG causes the CPU 102 to calculate expression (5) to determine the correlation coefficient R, and defines the linear function of expression (2) by using the sample data SD for which the correlation coefficient R is 0.9 or more.

In an example of another method for eliminating the sample data SD having large variations, the sample data SD for which a coefficient of determination $R^2$ is 0.9 or more may be used to define the linear function of expression (2).

The coefficient of determination $R^2$ can be determined by squaring the correlation coefficient R.

In an example of yet another method for eliminating the sample data SD having large variations, the sample data SD for which the correlation coefficient R is 0.9 or more and the coefficient of determination $R^2$ is 0.9 or more may be used to define the linear function of expression (2).

By the processing described above, the linear function equation of expression (2), in which the values of constants a (inclination) and b (y segment) are fixed, is determined. The linear function equation is stored and registered in, for example, the flash memory 104.

Thus, the PC 101 implements the function of the definition unit that defines the relationship between a measurement value at the criterion time CT in the unstable period A and a measurement value in the stable period B by the linear function on the basis of a plurality of generated sample data SD.

(3) Leakage Amount Estimation Step

Figure 5:
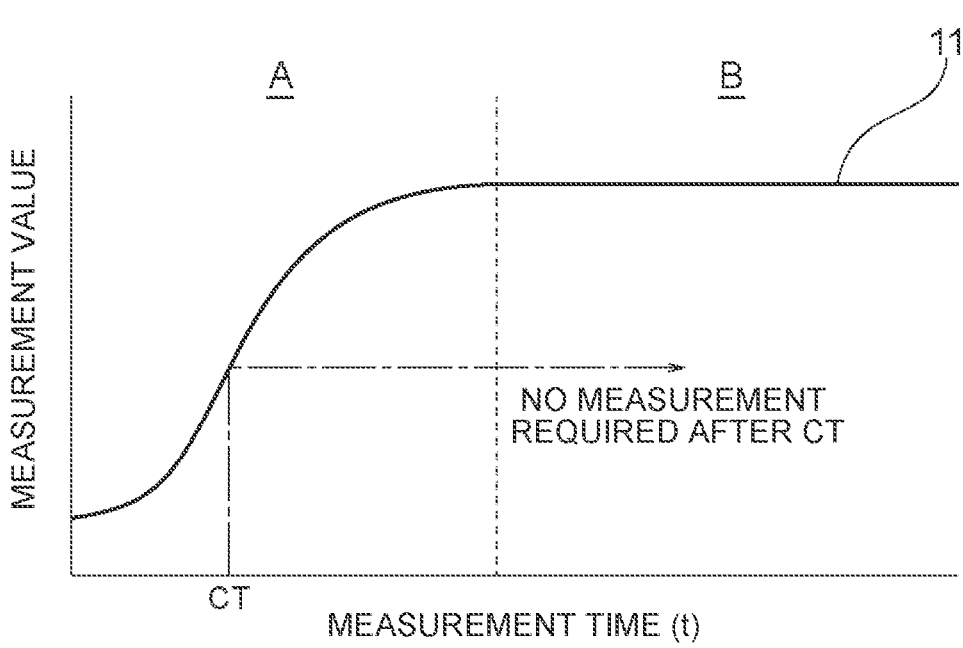
FIG. 5 is a schematic diagram graphically representing the processing of estimating the measurement value of a sealing component, which will be inspected, in the stable period on the gas permeability curve of the sealing component.
Figure 6:
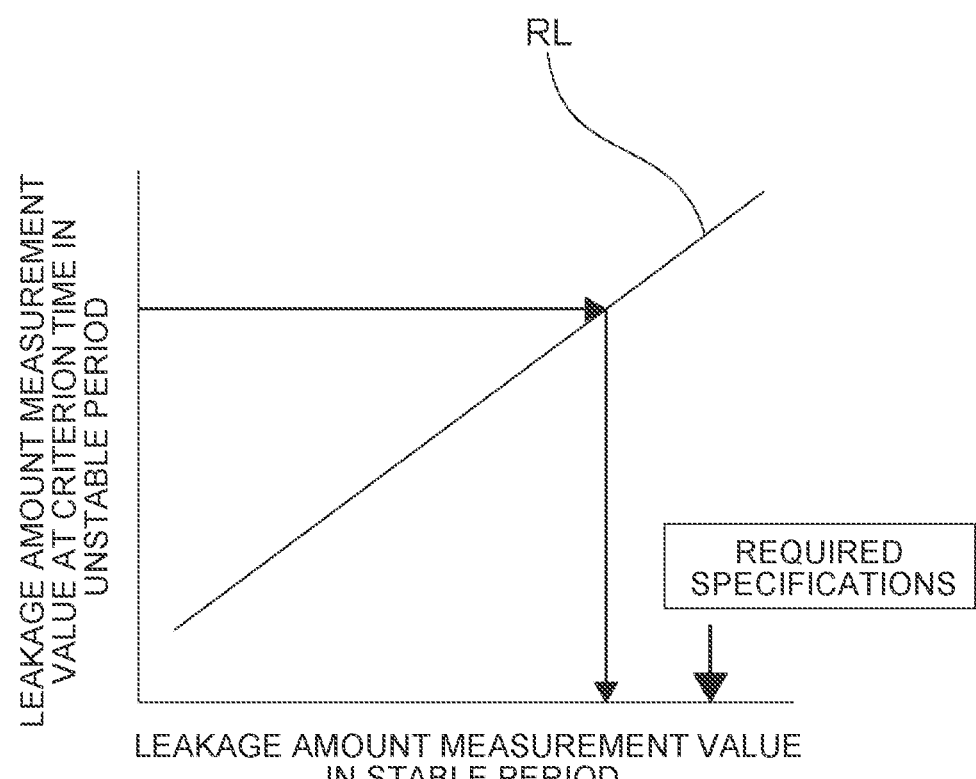
FIG. 6 is a schematic diagram graphically representing the processing of estimating, on the regression line of a linear function, the measurement value of a sealing component to be inspected in the stable period.

As illustrated in FIG. 5 and FIG. 6, in this step, a sealing component, which is an inspection object, is inspected, and a measurement value in the stable period B is estimated on the basis of a measurement value of the gas permeation amount Q (t) at the predetermined criterion time CT. The object to be inspected is a sealing component manufactured according to the same specifications as those for a plurality of sealing components on which the leak testing has been performed in the sample acquisition step.

To perform the leakage amount estimation step, a measurement value of the gas permeation amount Q (t) of a sealing component, which is to be inspected, at the criterion time CT, is substituted into Y of the linear function of expression (2) defined in the function definition step. Once the operator acquires the measurement value at the criterion time CT in the unstable period A among the permeation amounts Q (t) displayed on the display 202 of the leak detector 201, the operator inputs the value in a cell of the spreadsheet software, which is the inspection program PG. The input data is temporarily stored in, for example, the work area of the main memory 103.

When an instruction is issued to perform the leakage amount estimation step by a program such as a macro or by a command based on a manual input by the operator, the inspection program PG calls the linear function equation (refer to expression (2)) registered in the flash memory 104. Then, the value of the gas permeation amount Q (t) at the criterion time CT temporarily stored in the work area is substituted into Y of the linear function equation. The measurement value (Y value) at the criterion time CT is used as an explanatory variable. Consequently, the measurement value (X value) of the permeation amount Q (t) in the stable period B can be estimated by transforming expression (2) to expression (3) in which the X value, which is an objective variable, is placed on the left side.

Thus, the PC 101 uses the linear function to implement the function of the estimation unit that estimates a measurement value in the stable period B on the basis of a measurement value at the criterion time CT in the unstable period A of a sealing component to be inspected, which has been manufactured according to the same specifications as those for the plurality of rubber sealing components.

The inspection program PG causes the display device 108 to display the estimated value of the gas permeation amount Q in the stable period B on the inspected sealing component. The operator refers to the displayed estimated value, and determines that the sealing component has passed the inspection if the estimated value does not exceed the required specifications of the sealing component, which is the inspection object (refer to FIG. 6).

5. Summary

In the function definition step and the leakage amount estimation step, a measurement value of the permeation amount Q (t) in the stable period B is estimated on the basis of the value of the permeation amount Q (t) measured at the criterion time CT in the unstable period A by a method called simple regression analysis using a linear function. Therefore, according to the present embodiment, the measurement value in the stable period B of a sealing component to be inspected can be estimated at a stage before a measurement value transitions from the unstable period A to the stable period B in the helium leak testing by the helium leak detector 201. This makes it possible to shorten the time required for the permeation inspection for inspecting a sealing component for permeation leakage.

For the implementation, a configuration may be adopted, in which, for example, the leak detector 201 is connected to the PC 101, and the data of the gas permeation amount Q (t) is automatically transmitted from the leak detector 201 to the PC 101 as necessary when one or both of the sample acquisition step and the leakage amount estimation step are performed. Such processing can be performed by installing the inspection program PG also in the leak detector 201, or by configuring the leak detector 201 to be capable of transmitting data to the PC 101 in response to a request from the PC 101.

The invention claimed is:

1. A sealing component inspection method comprising the steps of:

measuring, using a helium leak detector, a gas permeation amount of each of a plurality of rubber sealing components manufactured according to the same specifications;

acquiring from the helium leak detector, for each of the sealing components, sample data formed of a pair of a measurement value at a predetermined criterion time in a first period during which a permeation amount is increasing, and a measurement value in a second period during which the permeation amount is constant;

defining a relationship between the measurement value at the criterion time and the measurement value in the second period by a linear function on the basis of a plurality of acquired sample data;

measuring using a helium leak detector, the gas permeation amount of a sealing component which will be inspected and has been manufactured according to the same specifications as those for the plurality of rubber sealing components; and estimating, by using the linear function, a measurement value of the sealing component, which will be inspected, in the second period on the basis of the measurement value thereof at the criterion time.

2. The sealing component inspection method according to claim 1, wherein the linear function uses a measurement value at the criterion time among the sample data as an explanatory variable, and a measurement value in the second period as an objective variable, and a measurement value of the sealing component, which will be inspected, in the second period where a permeation amount is constant is estimated by simple regression analysis using the linear function.

3. The sealing component inspection method according to claim 1, wherein the linear function is determined by least square method.

4. The sealing component inspection method according to claim 2, wherein the linear function is determined by least square method.

5. The sealing component inspection method according to claim 1, wherein the linear function has a correlation coefficient of 0.9 or more.

6. The sealing component inspection method according to claim 1, wherein the linear function has a coefficient of determination of 0.9 or more.

7. The sealing component inspection method according to claim 1, wherein the linear function has a correlation coefficient of 0.9 or more and a coefficient of determination of 0.9 or more.

8. A sealing component inspection device comprising:

a helium leak detector configured to determine a gas permeation amount of a rubber sealing component;

an input unit to which a measurement value of the gas permeation amount of the rubber sealing component measured by the helium leak detector is input;

a sample generation unit that generates, for each measurement value of a plurality of sealing components manufactured according to the same specifications, sample data formed of a pair of a measurement value at a predetermined criterion time in a first period during which the gas permeation amount is increasing, and a measurement value in a second period during which the permeation amount is constant;

a definition unit that defines a relationship between a measurement value at the criterion time and a measurement value in the second period by a linear function on the basis of a plurality of generated sample data; and an estimation unit that estimates a measurement value of a sealing component, which will be inspected and has been manufactured according to the same specifications as those for the plurality of rubber sealing components, in the second period by using the linear function on the basis of the measurement value thereof at the criterion time.

9. The sealing component inspection device according to claim 8, wherein the definition unit defines the linear function by using a measurement value at the criterion time among the sample data as an explanatory variable, and a measurement value in the second period as an objective variable, and the estimation unit estimates a measurement value of the sealing component, which will be inspected, in the second period by simple regression analysis using the linear function.

10. A sealing component inspection program installed in a computer to cause the computer to implement:

a function to accept input of a measurement value of a gas permeation amount of each of a plurality of rubber sealing components, which have been manufactured according to the same specifications, as measured by a helium leak detector;

a function of generating, for each of the sealing components, sample data formed of a pair of a measurement value at a predetermined criterion time in a first period during which the gas permeation amount is increasing and a measurement value in a second period during which the gas permeation amount is constant;

a function of defining, by a linear function, a relationship between a measurement value at the criterion time and a measurement value in the second period on the basis of a plurality of generated sample data;

a function of accepting input of a measurement value of a gas permeation amount of a sealing component which will be inspected and has been manufactured according to the same specifications as those for the plurality of rubber sealing components, the gas permeation amount being measured by the helium leak detector; and a function of estimating, using the linear function, a measurement value of the sealing component, which will be inspected, in the second period on the basis of the measurement value thereof at the criterion time.

11. The sealing component inspection program according to claim 10, wherein the linear function is defined using a measurement value at the criterion time among the sample data as an explanatory variable and a measurement value in the second period as an objective variable, and a measurement value of a sealing component, which will be inspected, in the second period is estimated by simple regression analysis using the linear function.

\* \* \* \* \*